(12) United States Patent
Yoon et al.

(10) Patent No.: US 9,255,797 B2
(45) Date of Patent: Feb. 9, 2016

(54) LIGHT SENSOR HOLDER FOR TRACKING LOCATION OF SUNLIGHT

(71) Applicant: TM Tech Co., Ltd., Gyeongsangnuk-Do (KR)

(72) Inventors: Joo-Sik Yoon, Daegu (KR); Joo-Pyung Yoon, Daegu (KR)

(73) Assignee: TM Tech Co., Ltd., Gyeongsangbuk-do (KR)

( * ) Notice: Subject to any disclaimer, the term of this patent is extended or adjusted under 35 U.S.C. 154(b) by 224 days.

(21) Appl. No.: 13/967,903

(22) Filed: Aug. 15, 2013

(65) Prior Publication Data

US 2013/0329223 A1    Dec. 12, 2013

Related U.S. Application Data

(62) Division of application No. 13/129,568, filed as application No. PCT/KR2009/005977 on Oct. 16, 2009, now Pat. No. 8,822,909.

(30) Foreign Application Priority Data

Nov. 17, 2008 (KR) .......................... 10-2008-0113820
May 27, 2009 (KR) .......................... 10-2009-0046470

(51) Int. Cl.
| H04N 1/04 | (2006.01) |
| G01C 15/00 | (2006.01) |
| F24J 2/38 | (2014.01) |
| G01S 3/786 | (2006.01) |

(52) U.S. Cl.
CPC .................. *G01C 15/004* (2013.01); *F24J 2/38* (2013.01); *G01S 3/7861* (2013.01); *Y02B 10/20* (2013.01); *Y02E 10/47* (2013.01)

(58) Field of Classification Search
CPC .......... H04N 2201/03112; H04N 2201/03141; H04N 2201/03154
See application file for complete search history.

(56) References Cited

FOREIGN PATENT DOCUMENTS

| JP | 03-156250 | 7/1991 |
| JP | 09-243354 | 9/1997 |
| JP | 2000-155026 | 6/2000 |
| JP | 2002-310517 | 10/2002 |

*Primary Examiner* — Tony Ko
(74) *Attorney, Agent, or Firm* — Mintz Levin Cohn Ferris Glovsky and Popeo, P.C.; Kongsik Kim; Jonathan Western (57) ABSTRACT

A holder having a light sensor for tracking location of sunlight is disclosed. The light sensor holder includes a holder 100 in which a first light sensor 401 is set, a first light guide section 141 including a light inputting hole 151 adjacent to a wall 300 at one side 111 of a body 110 in the holder 100 and formed in vertical direction, wherein a light is inputted through the light inputting hole 151, a second home 122 connected to the first light guide section 141 via a refraction section 172 and a second light guide section 142, wherein the light inputted through the light inputting hole 151 is refracted, and the refracted light is delivered to a sensing section 420 of a first light sensor 401 through a light outputting section 161, and a first home 121 adjacent to the second home 122, the first light sensor 401 being set in the first home 121.

7 Claims, 9 Drawing Sheets

LIGHT SENSOR HOLDER FOR TRACKING LOCATION OF SUNLIGHT

CROSS-REFERENCES TO RELATED APPLICATIONS

This application is a divisional application of U.S. Ser. No. 13/129,568 filed Jun. 1, 2011, which is a U.S. national phase application, pursuant to 35 U.S.C. §371, of PCT/KR2009/005977, filed Oct. 16, 2009, designating the United States, which claims priority to Korean Application No. 10-2008-0113820, filed Nov. 17, 2008, and Korean Application No. 10-2009-0046470, filed May 27, 2009. The entire contents of the aforementioned patent applications are incorporated herein by this reference.

TECHNICAL FIELD

The present invention relates to a light sensor holder for tracking location of sunlight, more particularly relates to a holder for sensing finely sunlight using a light sensor such as Cds (Cadmium sulfide cell) even at sunny weather where the intensity of the light emitted from the sun is high.

The present invention relates to a holder for delivering sunlight inputted through a side of a body to a sensing section of a light sensor in a first home through an auxiliary light guide section having at least one light inputting hole and a light outputting section. As a result, the holder may sense finely the sunlight even at dawn or around evening at which intensity of the sunlight is low.

RELATED ART

Recently, price of crude oil has been rapidly increased because human beings depend on only definite electricity, gas and crude oil. Since human beings use generally crude oil energy, environment pollution problem caused by increment of greenhouse gas, etc. occur seriously.

Alternative energy using nature such as solar heat, wind power, tidal power, etc. which can be infinitely used without environment pollution in environmental-friendly system has been actively studied. Specially, devices for generating hot water used in a house and industries or heat source needed for heating using the solar heat have been actively developed.

Figure 1:
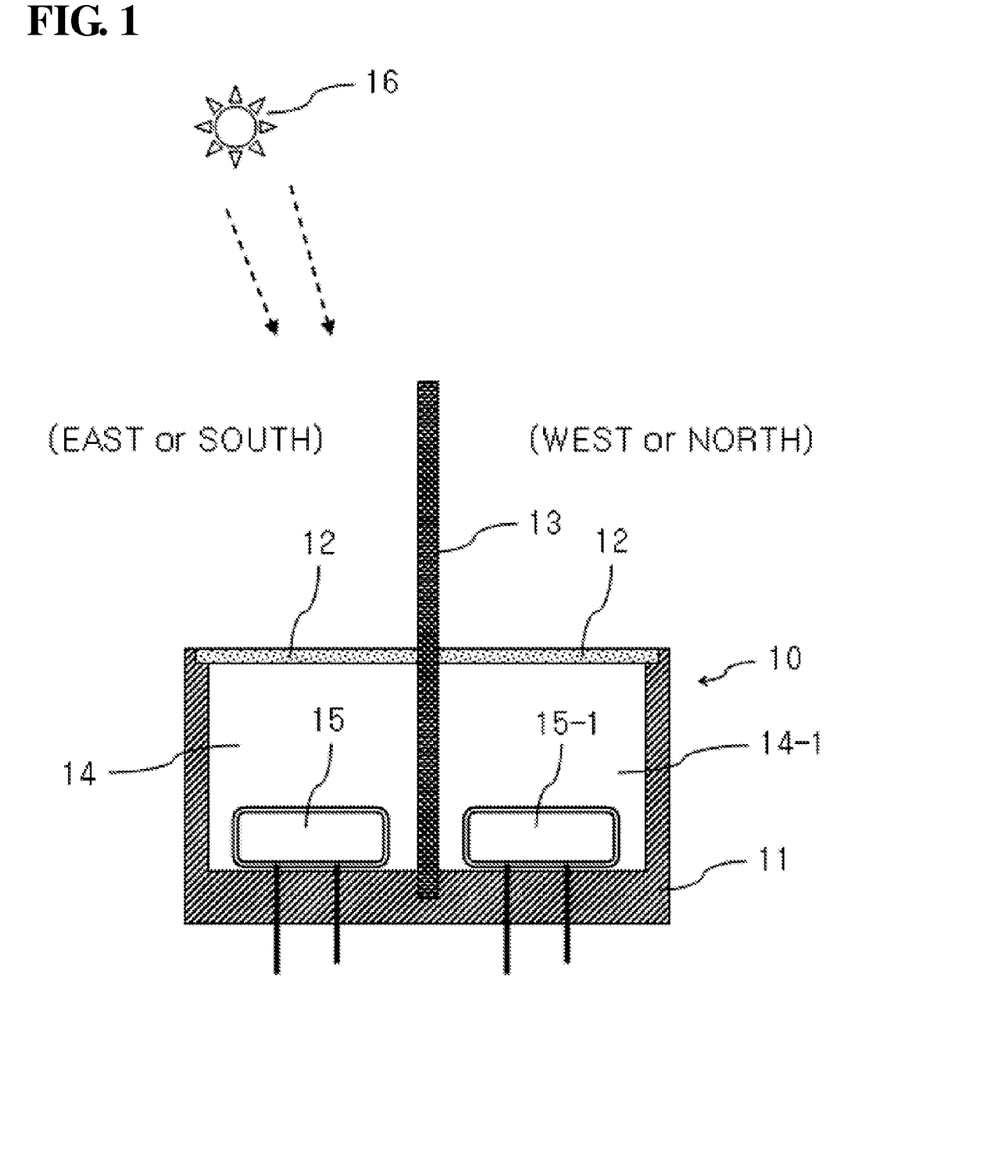
FIG. 1 is a view illustrating a conventional holder in which a light sensor for tracking location of sunlight is set.

FIG. 1 is a view illustrating a conventional holder in which a light sensor for tracking location of sunlight is set.

In a holder 10 where a light sensor, i.e. Cds device for tracking location of sunlight is set, a first home 14 and a second home 14-1 are formed by establishing a wall 13 to a center of a body having circular cylinder shape or square pillar shape as shown in Korean patent No. 2007-0088774 filed on Sep. 3, 2007. A pair of a first light sensor 15 and a second light sensor 15-1 is set in the first home 14 and the second home 14-1, respectively. A filter 12 made up of transparent substance or semi-transparent substance 13 is formed on an upper part of the body 11, and collects a light emitted from a sun 16.

Here, various sensors such as Cds (Cadmium sulfide cell), photo transistor, etc. have been used as the light sensor. The Cds senses the emitted light through change of resistance in accordance with amount of light irradiated thereto.

For example, the Cds has generally resistance of 5Ω to 250Ω, and operates by sensing amount of the light irradiated thereto. The Cds performs light-on operation using its characteristics that its resistance is high in dark environment and decreases according as the amount of the light irradiated to surface of the Cds increases.

That is, resistance of the Cds decreases in case that the sunlight is irradiated on the surface of the Cds, thereby increasing current passing through the Cds. As a result, the light-on operation is performed, and a sensing signal which is a current signal converted from an optical signal in accordance with the light-on operation is outputted.

The first light sensor 15 and the second light sensor 15-1 sense sunlight in the east direction and in the west direction or sunlight in the south direction and the north direction in accordance with their set direction. The solar plate (not shown) for generating solar power is connected to extra driving device (not shown), and tracks a light emitted from the sun 16 in accordance with the sensing result of the light sensors 15 and 15-1.

However, in case that the first light sensor 15 and the second light sensor 15-1 separated on the basis of the wall 13 sense the sunlight collected through the filter 12 at sunny weather where the intensity of the light emitted from the sun 16 is high, for example at illuminance of above 10000 1x, resistance of the first light sensor 15 is not substantially different from that of the second light sensor 15-1, i.e. resistance difference is e.g. 0Ω because shadow of the wall 13 does not nearly affect to the light sensors 15 and 15-1. As a result, location of the sunlight may not be accurately sensed.

Accordingly, the solar plate for generating solar power or a solar collector (not shown) for generating solar heat may not track the light emitted from the sun 16, and thus a device manufactured with high cost in consideration of energy save may not generate desired power or solar heat.

DISCLOSURE

Technical Problem

Accordingly, the present invention is provided to substantially obviate one or more problems due to limitations and disadvantages of the related art.

A holder having a light sensor of the present invention includes a light guide section having a refraction section, and so the holder may sense more finely a sunlight at sunny weather where the intensity of the light emitted from the sun 16 is high, for example at illuminance of above 10000 1x.

In addition, in a the holder of the present invention, sunlight inputted through a side of a body is delivered to a sensing section of a light sensor in a first home through an auxiliary light guide section having at least one light inputting hole and a light outputting section. As a result, the holder may sense finely the sunlight in the east direction or the west direction even at dawn or around evening at which intensity of the sunlight is low.

Furthermore, since the holder of the present invention senses finely the sunlight, a solar plate for generating solar power or a solar collector for generating solar heat may track easily the sunlight.

Technical Solution

In one aspect, the present invention provides a light sensor holder for tracking location of sunlight, the light sensor holder comprising: a pair of holders in which a first light sensor and a second light sensor are set; a first light guide section including a light inputting hole adjacent to a wall and formed in vertical direction, wherein the holders are located opposingly on the basis of the wall, and a light is inputted through the light inputting hole; a second home connected to the first light guide section via a refraction section and a second light guide section, wherein the light inputted through the light inputting hole is refracted, and the refracted light is delivered to a sensing section of the first light sensor or the second light sensor through a light outputting section; and a first home adjacent to the second home, wherein the first light sensor or the second light sensor is set in the first home.

In another aspect, the present invention provides a light sensor holder for tracking location of sunlight, the light sensor holder comprising: a holder in which a first light sensor is set; a first light guide section including a light inputting hole adjacent to a wall at one side of a body in the holder and formed in vertical direction, wherein a light is inputted through the light inputting hole; a second home connected to the first light guide section via a refraction section and a second light guide section, wherein the light inputted through the light inputting hole is refracted, and the refracted light is delivered to a sensing section of a first light sensor through a light outputting section; and a first home adjacent to the second home, the first light sensor being set in the first home.

In another aspect, the present invention provides a light sensor holder for tracking location of sunlight, the light sensor holder comprising: a pair of holders located opposingly on the basis of a wall; at least one light inputting hole formed on side of a body; and a second home. Here, a light inputted through the light inputting hole is delivered to a sensing section of a first light sensor or a second light sensor set in the first home through an auxiliary light guide section, a light outputting section and the second home.

In addition, the first home is adjacent to the second home, and the light sensor is inserted into the first home.

The holder includes an auxiliary light guide section having at least one light inputting hole formed at the side of the body and adjacent to the second home, and the light emitted from the sun is inputted into the light inputting hole.

The light inputted through the light inputting hole is delivered to a sensing section of the light sensor set in the first home through the auxiliary light inputting hole and a light outputting section.

Advantageous Effects

The present invention may enhance location change sensitivity of sunlight even at sunny weather where the intensity of the sunlight is high or at high illuminance. Accordingly, a solar plate for generating solar power or a solar collector for generating solar heat may track accurately location of the sunlight.

Additionally, a holder of the present invention may sense more finely location change of the sunlight in east direction or west direction using an auxiliary light guide section even at dawn or around evening at which intensity of the sunlight is low. Accordingly, a solar plate for generating solar power or a solar collector for generating solar heat may track accurately location of the sunlight.

BRIEF DESCRIPTION OF DRAWINGS

Example embodiments of the present invention will become more apparent by describing in detail example embodiments of the present invention with reference to the accompanying drawings, in which.

| | |
|---|---|
| 100, 100a: holder | 110: body |
| 111: side | 121: first home |
| 122: second home | 122a: space |
| 123: projecting member | 131, 831: combining home |
| 141: first light guide section | 142: second light guide section |
| 151, 851, 852: light inputting hole | 161, 861, 862: light outputting section |
| 171: fixing home | 172: refraction section |
| 200, 800: filter | 300: wall |
| 311: end part | 401: first light sensor |
| 401a: second light sensor | 411: lead line |
| 420: sensing section | 421: sensing line |
| 500: cap | 511: hole |
| 621: fixing member | 700: sun |
| 841, 842: auxiliary light inputting hole | |

DETAILED DESCRIPTION

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

In the following drawings, like reference numerals identify similar or identical elements.

Hereinafter, a holder for tracking location of sunlight of the present invention will be described in detail with reference to accompanying drawings.

Figure 2:
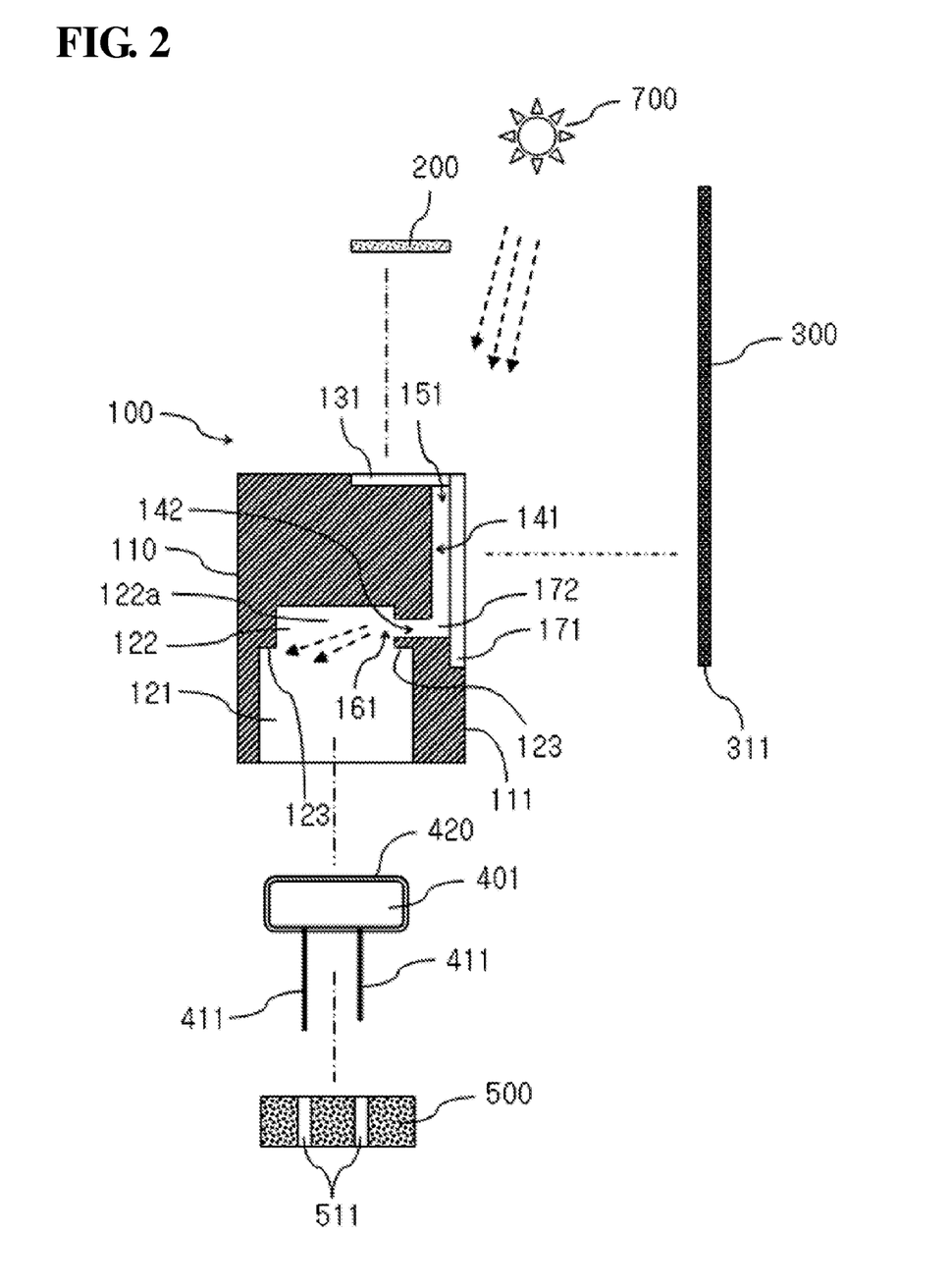
FIG. 2 is a exploded view illustrating set structure of a light sensor for tracking location of sunlight in a holder according to one example embodiment of the present invention.
Figure 3:
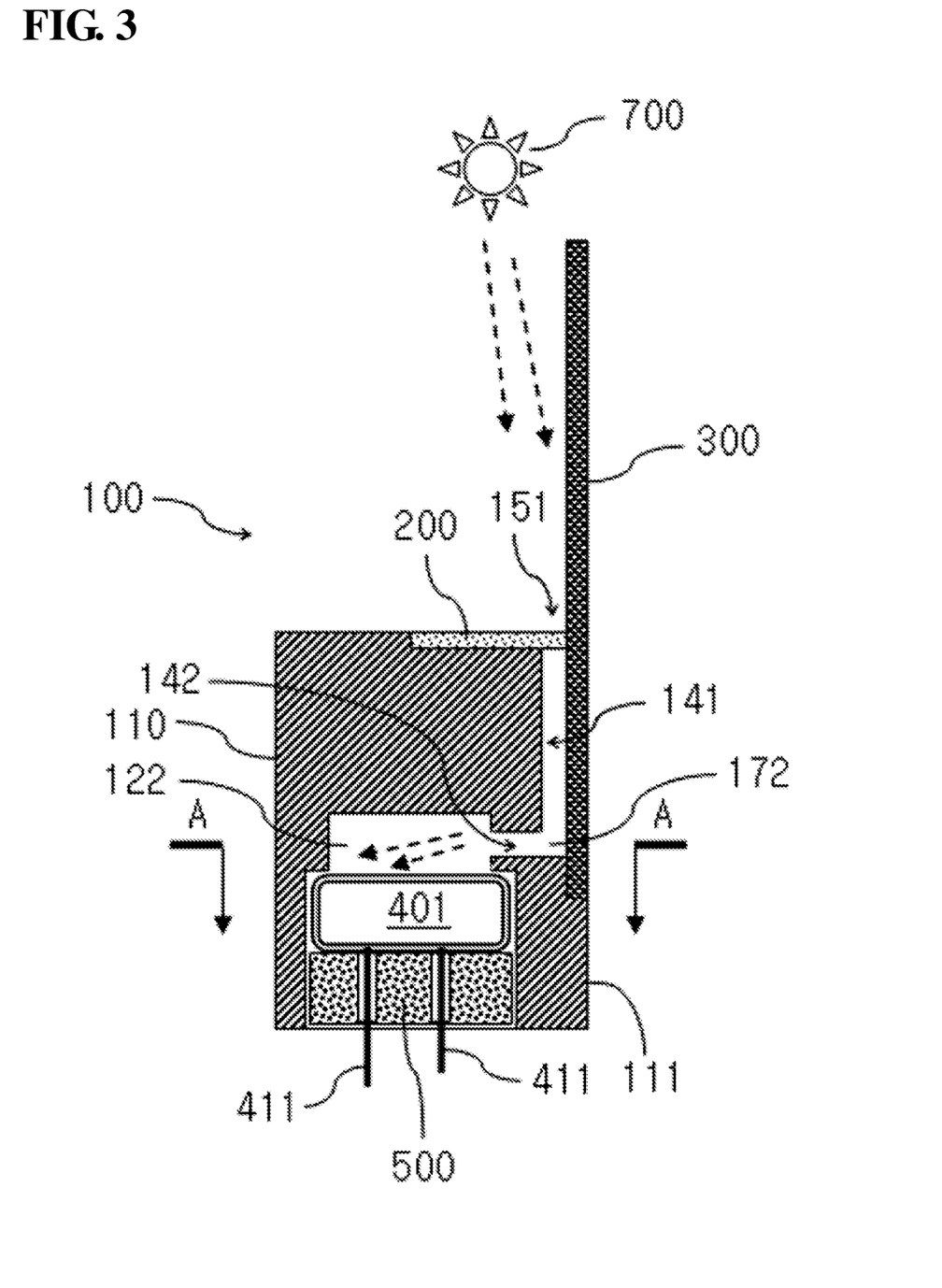
FIG. 3 is a sectional view illustrating set structure of a light sensor for tracking location of sunlight in the holder in FIG. 2.
Figure 4:
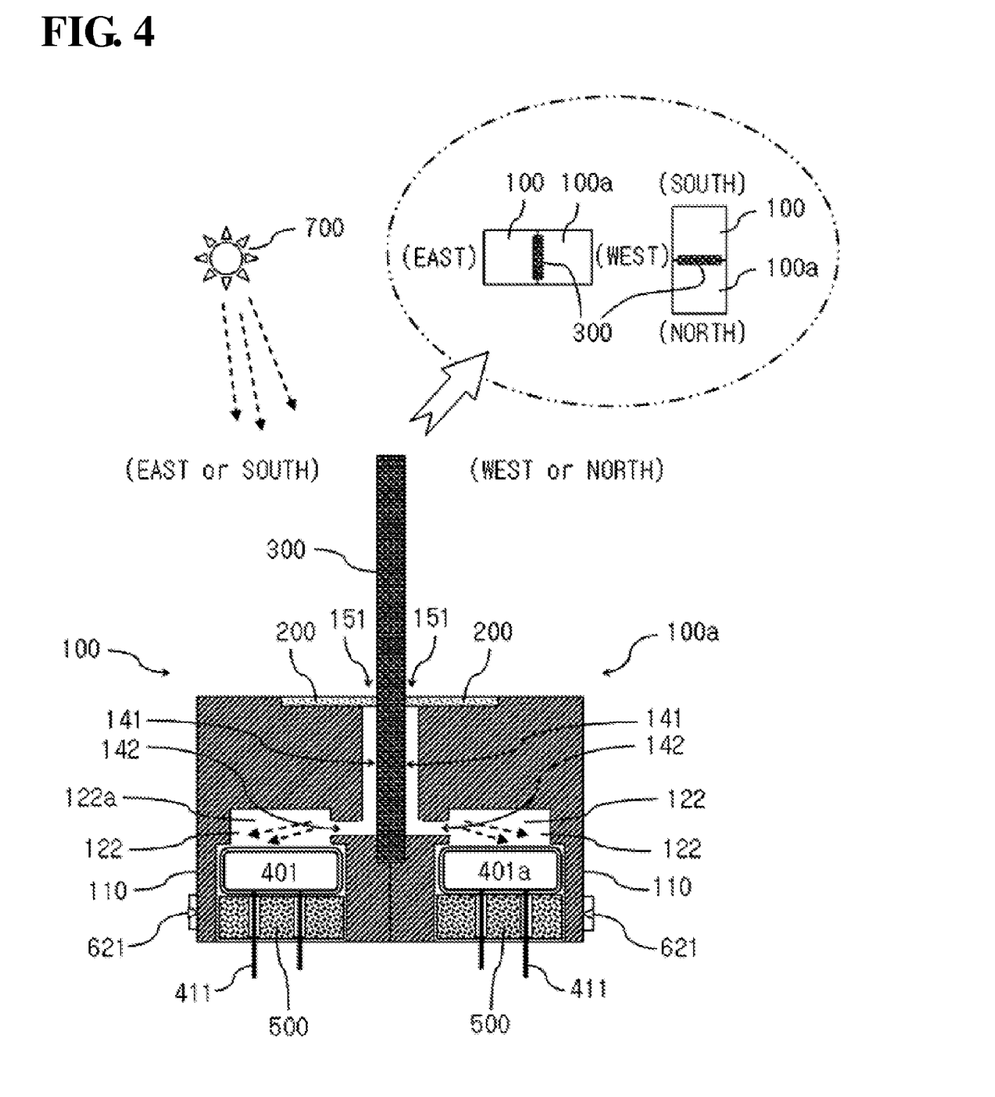
FIG. 4 is a sectional view illustrating set structure of light sensors in holders in FIG. 2.

Referring to FIG. 2 to FIG. 4, a holder 100 where a light sensor such as a Cds (Cadmium sulfide cell), etc. i.e. a first light sensor 401 or a second light sensor 401a is set has various shapes such as circular cylinder shape, square pillar shape, polygon pillar shape, etc., and is disposed in the east-west direction or the south-north direction.

A first home 121 is formed on a lower part of a body 110 included in the holder 100, and the first light sensor 401 or the second light sensor 401a is set in the first home 121. A wall 300 is fixed to a side 111 of the body 111, and makes shadow in response to a light emitted from sun 700 (sunlight).

In one embodiment of the present invention, a pair of holders 100 and 100a includes the first light sensor 401 and the second light sensor 401a, respectively. The first light sensor 401 senses the light emitted from the sun 700 located in the east direction or the south direction, and the second light sensor 401a senses the light emitted from the sunlight 700 located in the west direction or the north direction.

The holders 100 and 100a including a pair of the first light sensor 401 and the second light sensor 401a for sensing the light emitted from the sun 700 in east-west direction are established in a solar plate (solar panel, not shown) for generating solar power or a solar collector (not shown) for generating solar heat. In addition, it is desirable to establish another holders 100 and 100a including another pair of the first light sensor 401 and the second light sensor 401a for sensing the light emitted from the sun 700 in the south-north direction in the solar plate or the solar collector.

Resistance of the first light sensor 401 and resistance of the second light sensor 401a change in accordance with shadow of the wall 300 by the light emitted from the sun 700 in the east direction or the south direction, wherein the shadow is formed toward the first light sensor 401 or the second light sensor 401a. The light sensors 401 and 401a sense current passing theirthrough in accordance with the resistance, respectively.

Hereinafter, the present embodiment will be described in detail with reference to accompanying drawing FIG. 4.

FIG. 4 is a sectional view illustrating disposition of a pair of light sensors for tracking sunlight set in a pair of holders in FIG. 2 according to one embodiment of the present invention.

As described above, a pair of the first light sensor 401 and the second light sensor 401a is set in a pair of the holders 100 and 100a, respectively.

The holders 100 and 100a are fixed with one body, wherein a part 111 of the body 110 in the holder 100 faces to a part 111 of the body 110 in the holder 100a on the basis of the wall 300. Each of the holders 100 and 100a includes a light inputting hole 151 adjacent to the wall 300 at the part 111 of the body 110 and a first light guide section 141 in vertical direction. Here, the light emitted from the sun 700 is inputted through the light inputting hole 151.

It is desirable to fix the bodies 110 using a fixing member 621 in the holders 100 and 100a including the first light sensor 401 and the second light sensor 401a.

Here, the fixing member 621 may be a bolt and a nut, a fixing screw, a rivet, etc.

Additionally, a second home 122 is connected to the first light guide section 141 via a refraction section 172 and a second light guide section 142, and has a space 122a. The light inputted through the light inputting hole 151 is refracted, and the refracted light is delivered to a sensing section 420 of the first light sensor 401 or a sensing section 420 of the second light sensor 401a through a light outputting section 161 and the second home 122.

The holder 100 or 100a includes the first home 121 adjacent to the second home 122, and the first light sensor 401 and the second light sensor 401a are set in corresponding first home 121.

Another example embodiment of the present invention will be described in detail with reference to accompanying drawing FIG. 2.

FIG. 2 is an exploded view illustrating set structure of a light sensor for tracking location of sunlight into a holder according to one example embodiment of the present invention.

The holder 100 where the first light sensor 401 is to be set is prepared, and includes the light inputting hole 151 adjacent to the wall 300 at the part 111 of the body 110 and the first light guide section 141 formed in vertical direction. Here, the light emitted from the sun 700 is inputted through the light inputting hole 151.

The second home 122 having the space 122a is connected to the first light guide section 141 via the refraction section 172 and the second light guide section 142. The light inputted through the light inputting hole 151 is refracted, and the refracted light is delivered to the sensing section 420 of the first light sensor 401 or the sensing section 420 of the second light sensor 401a through the light outputting section 161 and the second home 122.

In addition, the holder 100 further includes the first home 121 adjacent to the second home 122, wherein the first light sensor 401 or the second light sensor 401a is set in the first home 121.

Another example embodiment of the present invention will be described in detail with reference to accompanying drawings FIG. 5 to FIG. 7.

Figure 5:
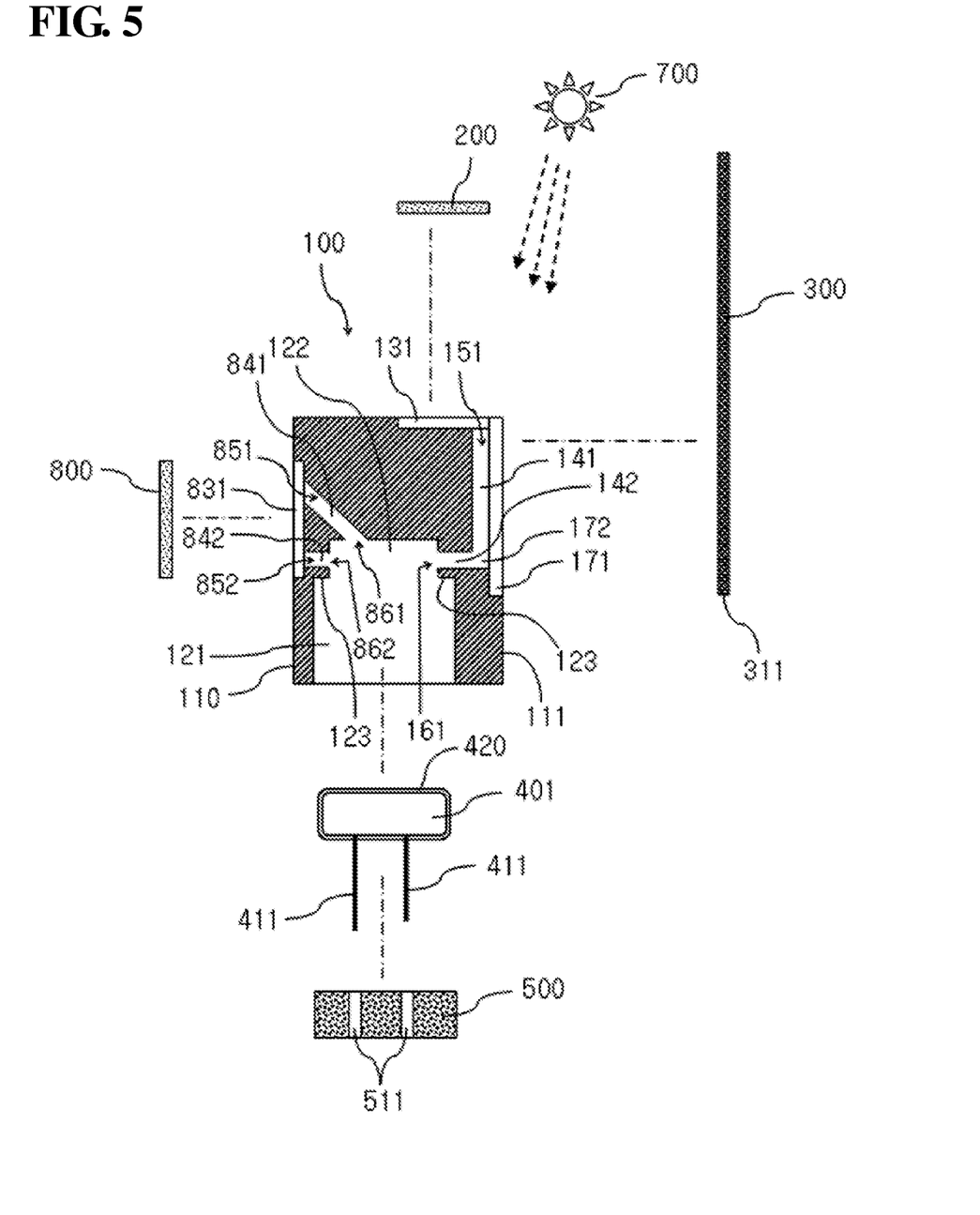
FIG. 5 is an exploded view illustrating set structure of a light sensor for sensing location of sunlight into a holder according to one example embodiment of the present invention.
Figure 6:
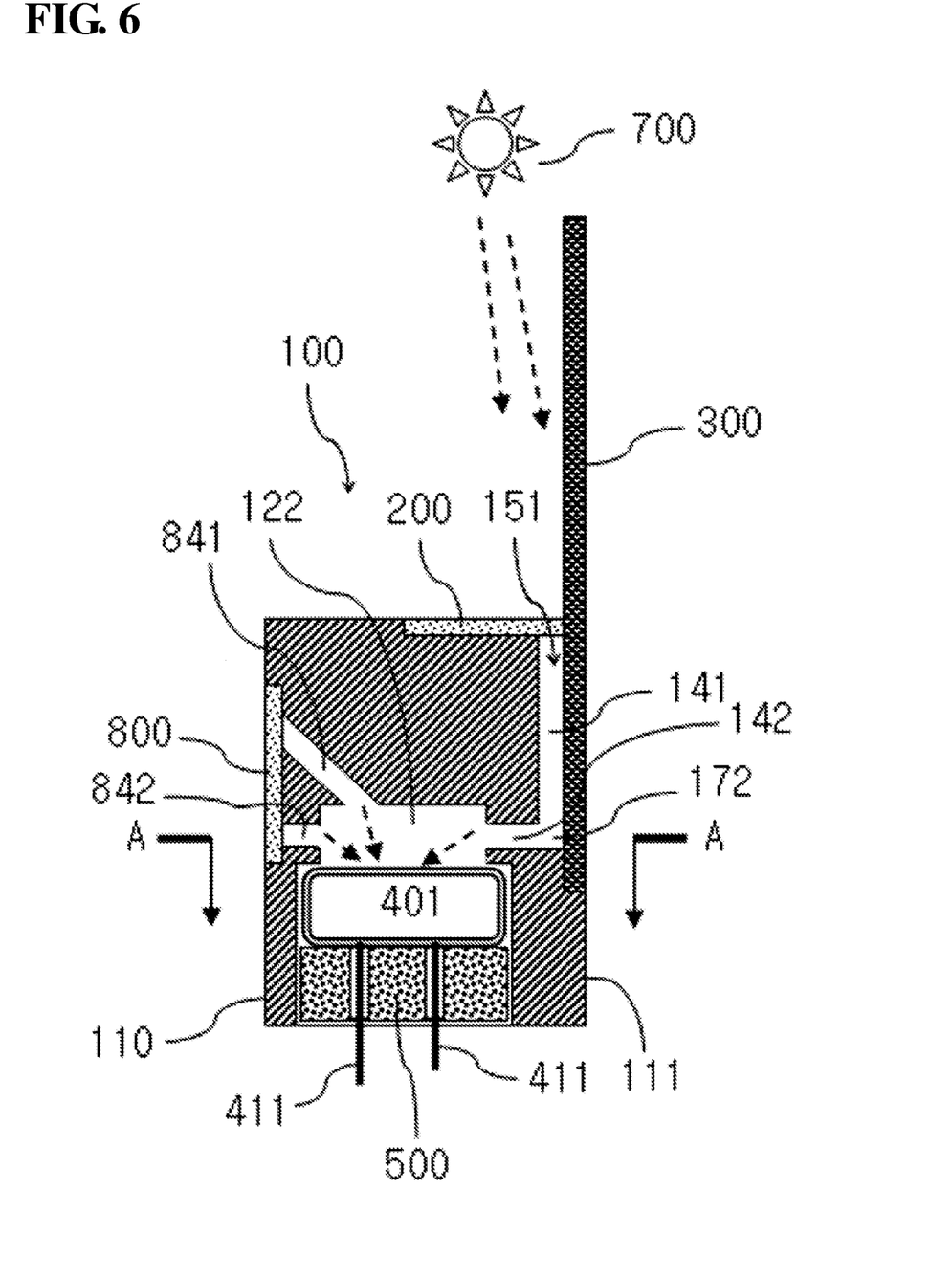
FIG. 6 is a sectional view illustrating set structure of a light sensor for tracking location of sunlight in the holder in FIG. 2 according to a first embodiment of the present invention.

FIG. 5 is an exploded view illustrating set structure of a light sensor for sensing location of sunlight into a holder according to one example embodiment of the present invention.

The holders 100 and 100a are fixed (adhered) with one body, wherein the part 111 of the body 110 in the holder 100 faces to the part 111 of the body 110 in the holder 100a on the basis of the wall 300 for generating shadow in response to the light emitted from the sun 700. Each of the holders 100 and 100a includes the light inputting hole 151 adjacent to the wall 300 at the part 111 of the body 110 and the first light guide section 141 in vertical direction. Here, the light emitted from the sun 700 is inputted through the light inputting hole 151.

Figure 7:
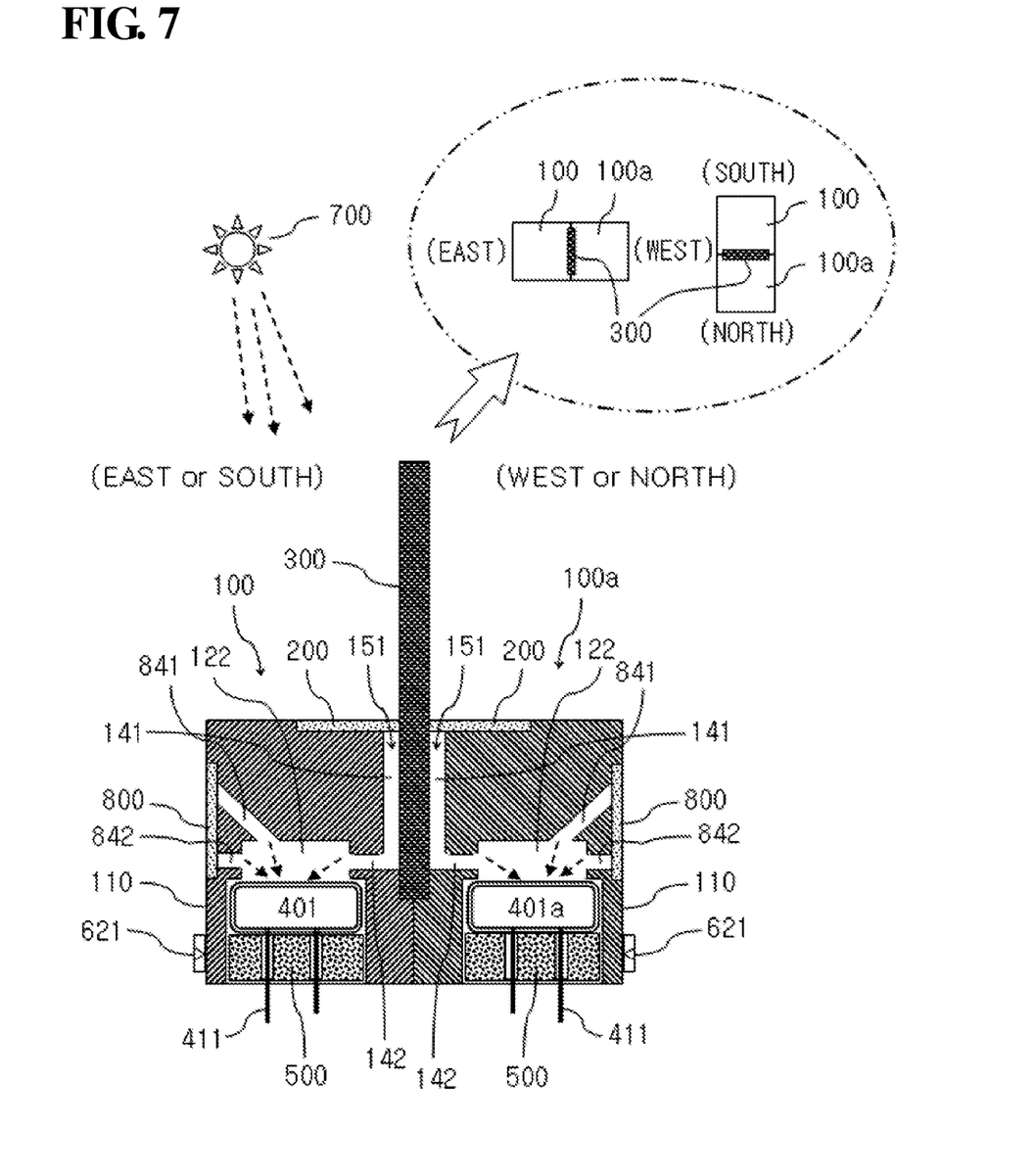
FIG. 7 is a sectional view illustrating set structure of light sensors in holders in FIG. 2 according to a second embodiment of the present invention.

In the holders 100 and 100a, the bodies 110 are fixed by a fixing member 621 such as a fixing screw, a rivet or fixing means, etc. as shown in FIG. 7.

Subsequently, the refraction section 172 for connecting the first light guide section 141 to the second light guide section 142 formed in horizontal direction and the second home 122 are formed. The light inputted through the light inputting hole 151 is refracted by the refraction section 172, and the refracted light propagates to the sensing section 420 of the light sensor 401 through the light outputting section 161 and the second home 122.

Furthermore, the holder 100 includes the first home 121 adjacent to the second home 122 on the basis of a projecting member 123, wherein the light sensor 401 is included in the first home 121. The holder 100 further includes auxiliary light guide sections 841 and 842 having at least one light inputting hole 851 and 852 and adjacent to the second home 122. The light emitted from the sun 700 is inputted into the auxiliary light guide sections 841 and 842 through side of the body 110.

The light inputted into the light inputting holes 851 and 852 is delivered to the sensing section 420 of the light sensor 401 set in the first home 121 through the auxiliary light guide sections 841 and 842 and the light outputting sections 861 and 862.

The auxiliary light guide sections 841 and 842 formed at the side of the body 110 may sense more finely location change of the sun 700 in east direction or west direction even at dawn or around evening at which intensity of the light emitted from the sun 700 is low.

That is, since altitude of the sun is very low at dawn or around evening, the shadow of the wall 300 may not occur on the light sensor 401 in location opposed to the sun 700. In addition, it is difficult to sense finely location of the sun 700 using only the light inputted through the first light guide section 141 and the second light guide section 142, wherein the location of the sun 700 is sensed by a pair of light sensors 401.

Accordingly, the holder 100 may form the auxiliary light guide sections 841 and 842 to sense easily location change of the sun 700 in the east direction or the west direction even at dawn or around evening at which intensity of the light emitted from the sun 700 is low due to low altitude of the sun 700.

Here, one or more auxiliary light guide section 841 or 842 is formed at the side of the body 110. The auxiliary light guide section 841 or 842 may be formed vertically to the side of the body 110 or with slope of 10° to 60° on the basis of on the side of the body 110, and thus the light inputted through the light inputting holes 851 and 852 of may be easily delivered to the sensing section 420 of the light sensor 401 or 401a through the light outputting sections 861 and 862 and the second home 122.

Hereinafter, common elements in embodiments of the present invention will be described in detail.

The first home 121 is adjacent to the second home 122 on the basis of the projecting member 123 as shown in FIG. 2, and the sensing section 420 of the first light sensor 401 or the second light sensor 401a are supported by the projecting member 123.

Here, it is desirable that diameter of the first home 121 is greater than that of the second home 122 including the space 122a.

Figure 8:
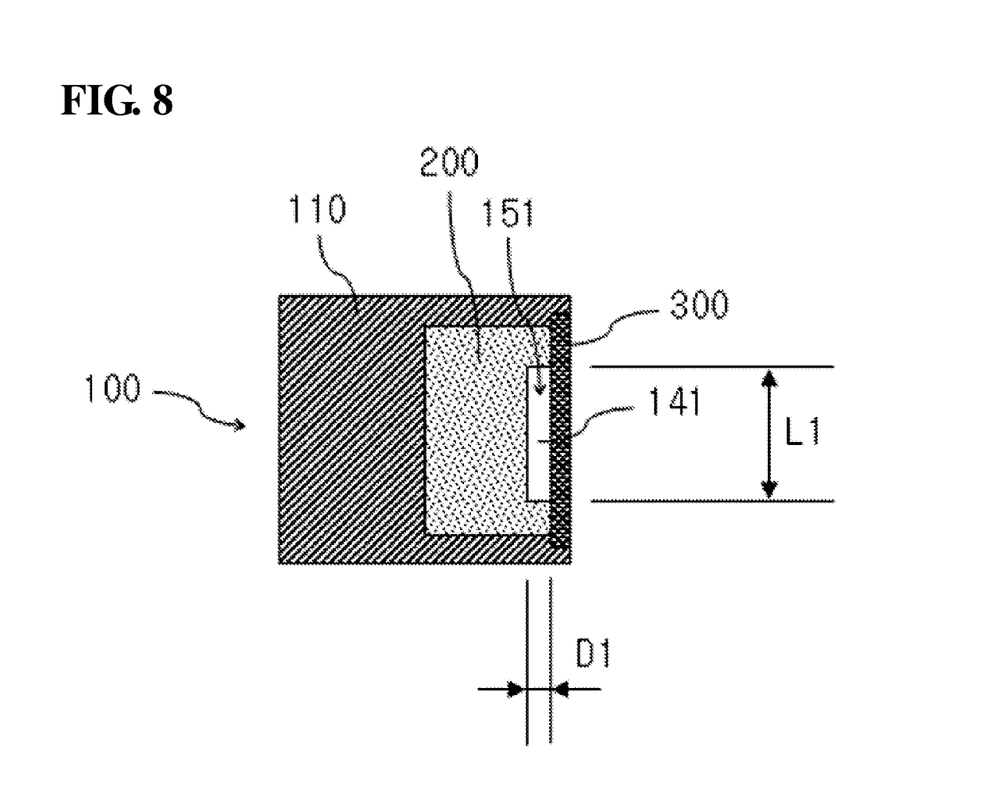
FIG. 8 is a view illustrating set structure of a light sensor in a holder in horizontal direction in FIG. 2 and FIG. 5.

The second light guide section 142 may be formed with the same length L1 and width D1 as the first light guide section 141 in horizontal direction as shown in FIG. 8 which illustrates sectional view of the holder 100 taken in horizontal direction, and the refraction section 172 is formed between the first light guide section 141 and the second light guide section 142.

Accordingly, the holder 100 may sense finely the light even at sunny weather where the intensity of the light emitted from the sun 700 is high or at high illuminance of e.g. above 10000 1×, thereby enhancing location change sensitivity of the sun 700.

The auxiliary light guide sections 841 and 842 formed at the side of the body 110 may be formed with the same length L1 and width D1 as the first light guide section 141 in horizontal direction.

Figure 9:
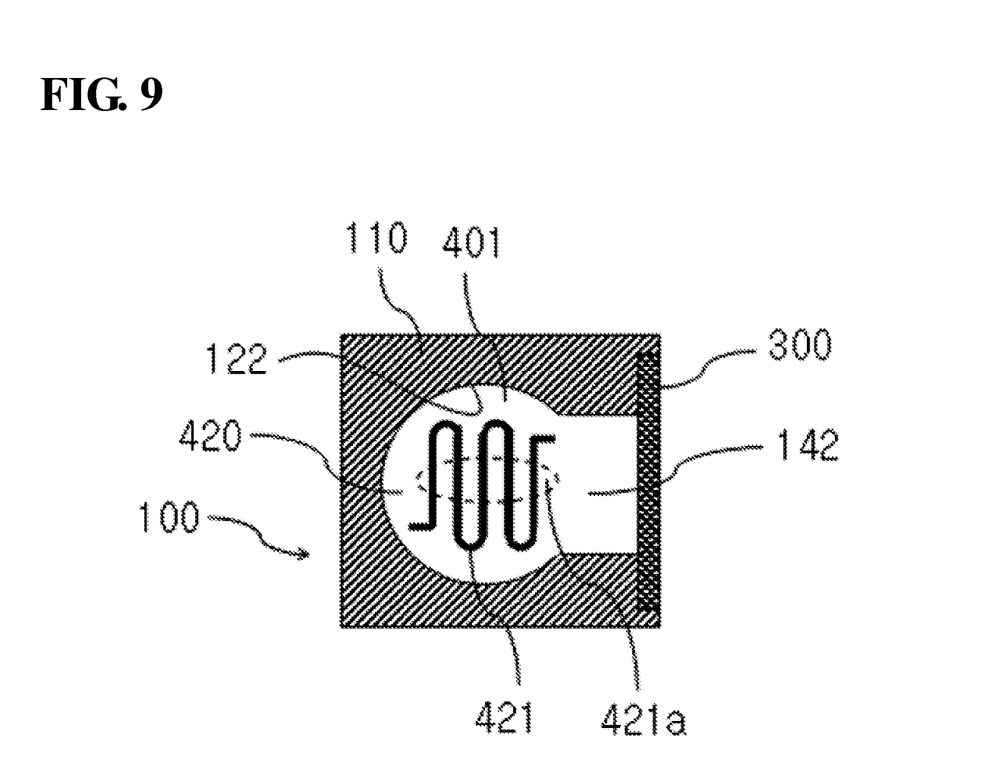
FIG. 9 is a view illustrating set structure of a light sensor in a holder taken by A-A' in horizontal direction in FIG. 3 and FIG. 6.

Straight line part 421a of a sensing line 421 in the sensing section 420 of the light sensor 401 or 401a set in the first home 121 is formed in parallel to a part corresponding to the length L1 of the first light guide section 141 in horizontal direction as shown in FIG. 9, and thus the holder 100 may sense more easily the light through the sensing line 421.

An end part 311 of the wall 300 combines with a fixing home 171 so that the wall 300 is disposed in parallel to the first light guide section 141. Here, since the wall 300 should generate the shadow in response to the light emitted from the sun 700, it is desirable that the wall 300 is made up of opaque metal or synthetic resin.

Size of the wall 300 may be determined so that adequate shadow of the wall 300 is generated on an upper part of the body 110 in the holder 100 in response to the light emitted from the sun 700.

A combining home 131 having rectangular shape is formed adjacent to the light inputting hole 151 on the upper part of the body 110. A filter 200 made up of transparent or opaque glass or synthetic resin, etc. is formed on the combining home 131 by extra adhering means.

In one embodiment of the present invention, transparent or opaque adhesion substance or silicon, etc. may be bonded on the light inputting hole 151 instead of the filter 200 so that rain and dust, etc. are inputted through the light inputting hole 151.

A combining home 831 having rectangular shape is formed adjacent to the light inputting holes 851 and 852 of the auxiliary light guide sections 841 and 842 formed at the side of the body 110. In addition, a filter 800 made up of transparent or opaque glass or synthetic resin, etc. may be formed on the combining home 831 by extra adhering means.

A cap 500 for fixing the first light sensor 401 and the second light sensor 401a may be inserted into the first home 121 located on a lower part of the body 110.

Here, the cap 500 may be bonded with epoxy or silicon when the light sensors 401 and 401a are set in the home 121 so that the light does not propagate into the home 121 from outside and rain, etc. is not inputted into the home 121.

Numerical number 511 in FIG. 2 and FIG. 5 means a hole into which a lead line 411 of the light sensors 401 and 401a is inserted.

It is desirable to set the refraction section 172 connected between the first light guide section 141 and the second light guide section 142 with slope of 90° to 160° on the basis of the wall 300 so that the light inputted through the light inputting hole 151 is easily delivered to the sensing section 420 formed on the surfaces of the light sensors 401 and 401a through the light outputting section 161.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A light sensor holder for tracking location of sunlight, the light sensor holder comprising:
   a pair of holders located opposingly with respect to a wall;
   at least one light inputting hole formed on a side of a body; and
   a second home,
   wherein a light inputted through the at least one light inputting hole is delivered to a sensing section of a first light sensor or a second light sensor set in a first home through an auxiliary light guide section, a light outputting section and the second home.

2. The light sensor holder of claim 1, wherein a length and a width of the auxiliary light guide section in a horizontal direction are identical to length L1 and width D1 of a first light guide section in the horizontal direction.

3. The light sensor holder of claim 1, further comprising:
   a combining home with a rectangular shape connected to the at least one light inputting hole formed on the side of the body; and
   a filter formed on the combining home, wherein the filter is made up of a transparent or a semi-transparent substance, wherein the at least one light inputting hole formed on the side of the body is filled with a transparent or a semi-transparent adhesion substance.

4. The light sensor holder of claim 1, wherein the auxiliary light guide section is inclined perpendicular to the side of the body or inclined with a slope of 10° to 60° with respect to the side of the body.

5. The light sensor holder of claim 1, further comprising:
a space formed in the second home and configured to disperse light.

6. The light sensor holder of claim 1, wherein a diameter of the first home is greater than that of the second home.

7. The light sensor holder of claim 1, wherein the sensing section of the first light sensor or the second light sensor is supported by a projecting member formed between the first home and the second home.

\* \* \* \* \*